Feb. 6, 1968 W. GRESCH 3,367,635
ARRANGEMENT FOR THE DEGASIFICATION OF PLASTIC MASSES
DURING THEIR TREATMENT BY MEANS OF A CONTINUOUS
MIXING AND KNEADING WORM
Filed Jan. 26, 1966 though by the worm shaft and moved to the outlet nozzle. During this treatment the stated ingredients are mixed, heated and often undergo a chemical change. During this it is important that the product emerging through the nozzle is homogeneous and free of pores.

United States Patent Office 3,367,635
Patented Feb. 6, 1968

3,367,635
ARRANGEMENT FOR THE DEGASIFICATION OF PLASTIC MASSES DURING THEIR TREATMENT BY MEANS OF A CONTINUOUS MIXING AND KNEADING WORM
Walter Gresch, Lachmattstrasse 55, Muttenz, Switzerland
Filed Jan. 26, 1966, Ser. No. 523.083
Claims priority, application Switzerland, Feb. 8, 1965, 1,691/65
2 Claims. (Cl. 259—4)

ABSTRACT OF THE DISCLOSURE

A device for the degasification of plastic masses during treatment in a continuous mixing and kneading operation wherein the plastic material is subjected to the action of rotating and axially reciprocating interrupted conveyor worms. The device includes at least one baffle ring of predetermined configuration for maintaining the axial distance between the worm vane and the baffle ring constant.

---

Figure 1:
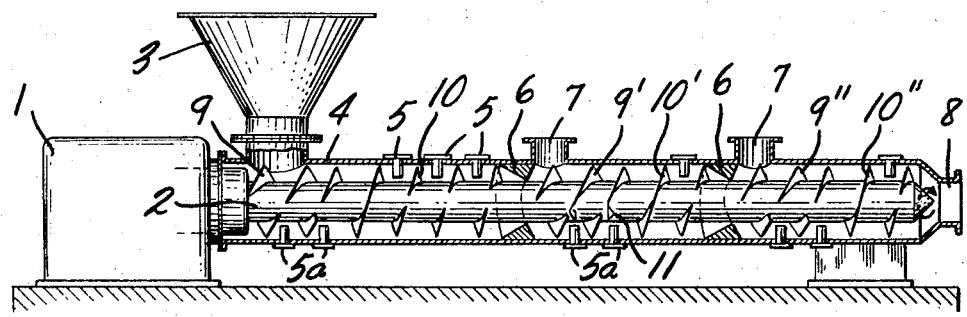

The present invention relates to an arrangement for the degasification of plastic masses during their treatment by means of a continuous mixing and kneading worm of which the shaft fitted with interrupted conveyor worm vanes carries out a to-and-fro movement as well as the rotation.

In the preparation of plastic masses, such as for example of synthetic plastics materials, there is introduced a measured mixture of synthetic material powder, colorant, plasticiser and filler into the treatment arrangement, placed under pressure by the worm shaft and moved to the outlet nozzle. During this treatment the stated ingredients are mixed, heated and often undergo a chemical change. During this it is important that the product emerging through the nozzle is homogeneous and free of pores.

During the introduction of the various materials into the worm machine it is not possible to prevent that the introduced material includes air and steam pores. Further because of the chemical change during the preparation gas-containing pores can result, which are undesired and must be removed. In certain instances it is necessary to remove from the material relatively readily volatile solvent media in the viscous fluid phase.

An extraction of the gases and vapours by direct connection of a vacuum pump or by a connection with the atmosphere does not lead to success, as the product is under pressure and as the small bubbles are surrounded by a thick layer of the viscous product so that they cannot break through to the outer surface. For these reasons it has already been proposed to use a baffle ring which reduces the passage between the worm shaft and the worm housing to a thin annular gap. The product emerges through this gap in the form of a thin hose so that the gas and vapour bubbles of small size can break through the thin layer and arrive at the outer surface. Directly after the baffle ring there is provided in the worm housing an opening for the emergence of the gases which leads into the atmosphere or into a vacuum. The baffle ring can remain still in the housing or be constructed on the shaft for rotation therewith. It is only important that no dead spaces result in which particles of product remain at rest and thereby change colour or decompose chemically. For this purpose the baffle rings are assembled of two cones, the first cone with acute opening angle reducing the cross-section gradually and the second cone with obtuse angle enlarging the cross-section again very rapidly.

If the worm shaft carries out only a rotation it is simple to allow the ends of the worm vanes to move past so close to the cones that no dead space results. In machines of which the shaft in addition to the rotary movement carries out an axial to-and-fro movement this close moving past by the baffle ring cannot be achieved with simple means. Further in such worm machines there exists the problem of the further conveying of the product flowing out of the baffle ring without any undesired blockage in spite of the axial movement of the shaft. Such a blockage would give rise to a thickening of the layer and thus a hindering of the emergence of the gas, whereby even an escape of the material through the vapour outlet slot can occur.

According to the invention it is now proposed that in the path of movement of the worm vanes is arranged at least one baffle ring of which the shape corresponds to the line of movement of the adjacent worm vane so that the gap width determined by the axial distance between the worm vane and the baffle ring is constant.

It is important that the thin layer also remains intact behind the baffle ring, and that also during the rearward movement of the shaft. The thin layer must not be broken up and dammed up, so that no material can escape through the degasification openings. For this purpose the conveying action of the worm in the region of and after the degasification opening is increased. Suitably for the purpose behind the baffle ring in the interruptions of the worm vanes are inserted passage-closing elements and the kneading teeth are removed, so that closed worm vanes result.

In the accompanying drawing an example of embodiment of the subject of the invention is represented, and there appear:

FIGURE 1 a vertical longitudinal section through the arrangement

Figure 2:
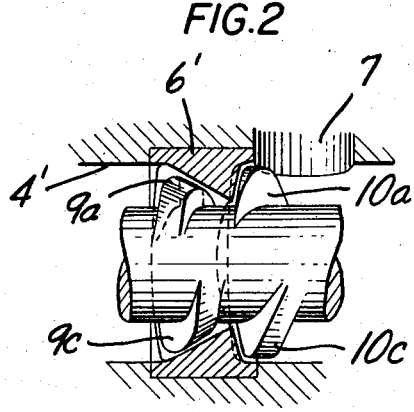
Figure 3:
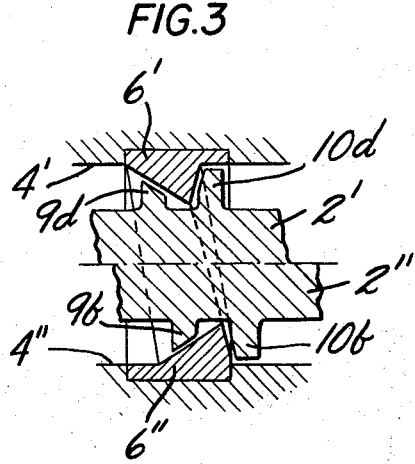
Figure 4:
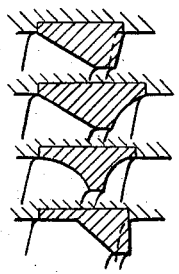

FIG. 2 a vertical longitudinal section to an enlarged scale through a baffle ring FIG. 3 a horizontal longitudinal section through the same baffle ring and FIG. 4 variations of the cross-section of the baffle ring.

The arrangement comprises a driving device 1 which drives a worm shaft 2 and simultaneously puts it into an axial to-and-fro movement. The worm shaft 2 is mounted in a housing 4, which has a charging hopper 3 and kneading bolts 5 and 5a. These bolts serving for the kneading operation are arranged distributed at the periphery of the housing and prevent a rotation of the product. Further there are provided in the housing 4 baffle rings 6, a gas removal connection piece 7 being provided after each baffle ring 6. The finished product passes out of the arrangement through the nozzle opening 8.

The worm shaft 2 is provided with interrupted worm vanes. The worm vanes 9, 9', 9" have a large pitch, whilst the worm vanes 10, 10', 10" have only a small pitch. Differences in the pitches are achieved in that either the inclination is varied or the worm is made with different vanes. The interruption between the worm vanes permits the penetration of the kneading bolts 5 and 5a.

The construction of the baffle rings in greater detail is visible in FIGURES 2 and 3. The baffle ring 6 is not made as a simple body of rotation, but is so shaped that the same corresponds to the axial movement of the worm shaft. It is now assumed that the beginning of the worm, which leads the product onwards from the baffle ring, has a middle position at the top and after 90° rotation reaches the extreme right-hand position. After 180° rotation the lower middle position is less reached, after 270° rotation the extreme left-hand axial position is reached, and after 360° rotation the initial position is reached again. The baffle ring formed in accordance with the invention always has the same small axial distance from the start of the worm. Considered purely geometrically the baffle ring can be divided into a number, for example 360, of radial lamellas, of these lamellas the first and 180th, that is to say the top and the bottom lamellas are not displaced, whilst the 90th and 270th corresponding to the end positions of the shaft are displaced in the axial direction to the maximum towards the right-hand or towards the left-hand. The axial positions of the remaining lamellas are determined according to the intermediate positions of the shaft.

In FIGURE 2 with 4' is represented the rear part of the housing, which suitably for the purpose is divided in the vertical longitudinal plane and can be swung apart for the purpose of cleaning. The corresponding part 6' of the baffle ring is inserted directly in front of the gas removal connection piece 7 in the housing part 4'. The end of the worm with small pitch is represented in the upper and in the lower axial middle position and indicated with 9a and 9c respectively. With 10a and 10c is illustrated the start of the worm with larger vane pitch in the upper middle position and in the lower middle position.

At the beginning of the rotation of the shaft the worm vane 9 is at first in the position 9a (top) and after 90° assumes the position 9b (FIG. 3) and further after 180° assumes the position 9c. The position of the worm vane after 270° is indicated with 9d, whereupon the worm vane returns again into the initial position 9a. Herein the baffle ring 6 is so shaped that the axial distance between the conical surfaces thereof and the bevelled ends of the worm remains the same in every shaft position. Similarly the worm vane 10 assumes the position 10a, 10b, 10c and 10d, the distance between the baffle ring 6 and the worm vane 10 being narrower in order to engage and drive on all the emerging product particles.

In order to be able to drive on the product emerging from the baffle ring without further blockage even when the shaft moves axially backwards towards the baffle ring there are inserted in the degasification zone two to three worm vanes of which the vane pitch is greater than in front of the baffle ring. Further it is suitable to close the interrupted vanes 9', 9" behind the gas extraction connection piece 7 by the insertion of vane closure elements 11 and to remove the corresponding kneading bolts 5a. Thus the conveying action of the worm is increased.

After this zone of increased pitch the pressure must again be freshly built up, and that by means of the following worm vanes which have only a small pitch. The worm vanes are interrupted in order to permit the penetration of the kneading teeth fixed in the housing and at the same time to achieve a kneading action.

In operation the product is charged into the arrangement and first comes into a zone of increased pitch, next into a zone of smaller pitch for the creation of pressure and kneading throughout. Next there is effected the degasification by means of the described baffle ring, whereby the pressure is freshly built up. The degasification can be effected once or several times, in the latter instance several baffle rings being arranged one behind another.

In FIGURES 1 to 3 the baffle rings are represented in profile as triangles. However it is also possible that the baffle rings may have other profiles, as can be seen from FIGURE 4. The four illustrated profiles correspond to the respective axial shaft displacement through the to-and-fro movement of the kneading worm.

What I claim is:

1. An arrangement for the degasification of plastic masses during their treatment by means of a continuous mixing and kneading device, said device comprising a housing with an inlet opening and an outlet opening arranged on different ends of said housing and with a gas removal aperture in the middle of said housing; a worm shaft arranged in said housing being connected to a driving device to cause a rotation and a reciprocating axial movement of said shaft; interrupted worm vanes being arranged on said shaft and kneading bolts mounted in said housing; in the path of movement of said worm vanes is arranged at least one baffle ring of which the shape corresponds to the line of movement of the adjacent worm vane so that the gap width determined by the axial distance between the worm vane and the baffle ring is constant.

2. An arrangement as claimed in claim 1, in which behind the baffle ring in the interruptions of the worm vanes are inserted vane closure elements and the kneading teeth are removed so that closed worm vanes result.

References Cited

UNITED STATES PATENTS

| | | | |
|---|---|---|---|
| 2,595,455 | 5/1952 | Heston | 18—12 |
| 2,970,341 | 2/1961 | Mallory et al. | 18—12 |
| 3,224,739 | 12/1965 | Schuur | 259—4 |

WILLIAM I. PRICE, *Primary Examiner.*

J. M. BELL, *Assistant Examiner.*